United States Patent
Lee et al.

(10) Patent No.: US 9,405,522 B2
(45) Date of Patent: Aug. 2, 2016

(54) SCENE-SOUND SET OPERATING METHOD AND PORTABLE DEVICE

(71) Applicant: HTC Corporation, Taoyuan County (TW)

(72) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 40 days.

(21) Appl. No.: 13/748,599

(22) Filed: Jan. 24, 2013

(65) Prior Publication Data

US 2014/0208310 A1    Jul. 24, 2014

(51) Int. Cl.
```
H04W 4/06      (2009.01)
G06F 9/445     (2006.01)
H04W 4/00      (2009.01)
H04M 1/725     (2006.01)
G06F 3/16      (2006.01)
```

(52) U.S. Cl.
CPC ............... *G06F 8/61* (2013.01); *H04W 4/001* (2013.01); *G06F 3/167* (2013.01); *H04M 1/72558* (2013.01)

(58) Field of Classification Search
CPC ............ G06F 7/78; G06F 8/00–8/78; G06F 9/44–9/445; G06F 11/36
USPC .................................................. 717/100–178
See application file for complete search history.

(56) References Cited

U.S. PATENT DOCUMENTS

| | | | |
|---|---|---|---|
| 2003/0065802 | A1 | 4/2003 | Vitikainen et al. |
| 2004/0148399 | A1* | 7/2004 | Fenizia ............... G06F 21/10 709/227 |
| 2009/0292723 | A1* | 11/2009 | Levin ............ H04M 1/72544 |
| 2010/0223393 | A1* | 9/2010 | Silverbrook et al. ......... 709/231 |
| 2011/0258292 | A1* | 10/2011 | Lee ..................... H04W 4/18 709/219 |
| 2011/0258329 | A1* | 10/2011 | Lee et al. .................... 709/227 |

FOREIGN PATENT DOCUMENTS

EP     1507390    2/2005

OTHER PUBLICATIONS

Kortina, Free Custom iPhone Ringtones Using Only iTunes, http://gigaom.com/2008/08/07/free-custom-iphone-ringtones-using-only-itunes/.*
Free Custom iPhone Ringtones Using Only iTunes, Aug. 7, 2008.*
(Continued)

*Primary Examiner* — Zhan Chen
(74) *Attorney, Agent, or Firm* — Jianq Chyun IP Office

(57) ABSTRACT

A scene-sound set operating method adapted to a portable device is provided. According to the method, the portable device receives an operation command from a scene-sound set system that provides a plurality of scene-sound sets; and a personal terminal device and the portable device simultaneously log in the scene-sound set system and correspond to each other in the scene-sound set system. The scene-sound set system transmits the operation command to the portable device according to a selection signal which is transmitted from the personal terminal device. The selection signal indicates selection of at least one of the scene-sound sets. According to the operation command, the portable device automatically downloads the selected scene-sound set from the scene-sound set system. The downloaded scene-sound set is installed in the portable device.

6 Claims, 3 Drawing Sheets

(56) References Cited

OTHER PUBLICATIONS

Kortina, Free Custom iPhone Ringtones Using Only iTunes, 2008.*
Lee, How to Hack a Dashboard Widget, 2012.*
"Office Action of European Counterpart Application", issued on Apr. 4, 2014, p. 1-p. 3, in which the listed references were cited.
"Office Action of European Counterpart Application", issued on Apr. 24, 2014, p. 1-p. 7.

* cited by examiner

SCENE-SOUND SET OPERATING METHOD AND PORTABLE DEVICE

BACKGROUND OF THE INVENTION

1. Field of the Invention

The invention relates to an operating method and system of a portable device. Particularly, the invention relates to a scene-sound set operating method and system of a portable device.

2. Description of Related Art

To keep up with the bustling pace of modern human life, a variety of readily portable and compact hand-held electronic devices have flourished. A home screen page on an exemplary handheld communication device (e.g., a PDA cellular phone or a smart phone) displays various functions of a conventional communication device. Besides, the exemplary handheld communication device also includes a plurality of control pages listing a variety of widgets allowing a user to perform a number of functions, e.g., write documents, send and receive emails, browse websites, or use instant messaging software by clicking these interface controllers. In other words, the handheld communication device may be used not only for making phone calls but also for providing all kinds of diversified functions as a small personal computer. With advances in the wireless network technology, utilization of these functions is no longer temporally and spatially confined and has gradually grown into a trend among the modern people who are efficiency-oriented and value time management.

However, to cope with different usage requirements of the user, various system manufacturers provide a plurality of online home screens or sound sets for the user to select and download to the handheld communication device for installation. Subject to the volume occupied by the handheld communication device, if different home screens and sound sets provided by the online systems are selected via the limited screen space, the menu displayed on the handheld communication device is generally text narrations in collaboration with corresponding snapshots. Thereby, when the user makes a selection from the online menu through the handheld communication device, the user can only imagine his selection according to the text narrations or the snapshots and is not able to preview an option screen nor pre-listen to a sound. If the user decides to preview an option screen or pre-listen to a sound, the user has to first download the home screen or the sound set to the handheld communication device. After installation, the user may then learn the actual scene-sound effect. Such screen configuration or sound set replacement significantly consumes network resources and reduces the convenience of use.

SUMMARY OF THE INVENTION

The invention is directed to a scene-sound set operating method by which operating steps of selecting and downloading scene-sound sets may be simplified.

The invention is directed to a portable device capable of previewing a scene-sound effect of a scene-sound set installed in a portable device in real time.

In an embodiment of the invention, a scene-sound set operating method adapted to a portable device is provided. The method includes a step of receiving an operation command by the portable device. Here, the operation command is transmitted from a scene-sound set system that is run by a computer device, and the scene-sound set system provides a plurality of scene-sound sets A personal terminal device and the portable device simultaneously log in the scene-sound set system and correspond to each other in the scene-sound set system, the scene-sound set system transmits the operation command to the portable device according to a selection signal transmitted from the personal terminal device, and the selection signal indicates selection of at least one of the scene-sound set. According to the operation command, the selected one of the scene-sound sets is automatically downloaded from the computer device by the portable device. The downloaded scene-sound set is installed in the portable device.

According to an embodiment of the invention, in the scene-sound set operating method, the operation command includes a set name and a set address of the selected one of the scene-sound sets.

According to an embodiment of the invention, in the scene-sound set operating method, the step of receiving the selection signal by the scene-sound set system further includes: modifying one of the scene-sound sets in the scene-sound set system to establish a customized scene-sound set or directly establishing a new scene-sound set.

According to an embodiment of the invention, in the scene-sound set operating method, the step of receiving the selection signal by the scene-sound set system further includes: generating a preview scene-sound effect on the personal terminal device, wherein the preview scene-sound effect of each of the scene-sound sets is installed in the portable device.

According to an embodiment of the invention, in the scene-sound set operating method, each of the scene-sound sets is selected from a group consisting of a scene set, a sound set, and a combination set of the scene set and the sound set.

According to an embodiment of the invention, in the scene-sound set operating method, the scene set includes a background frame and at least one widget.

According to an embodiment of the invention, in the scene-sound set operating method, the sound set includes a ringing sound, a notification sound, and a key feedback sound.

In an embodiment of the invention, a portable device that includes a computer readable and writable storage medium, a web signal transceiver, and a processor is provided. The computer readable and writable storage medium stores a computer readable program. The web signal transceiver receives an operation command transmitted from a scene-sound set system run by a computer device, and the scene-sound set system provides a plurality of scene-sound sets. A personal terminal device and the portable device simultaneously log in the scene-sound set system and correspond to each other in the scene-sound set system, the scene-sound set system transmits the operation command to the portable device according to a selection signal transmitted from the personal terminal device, and the selection signal indicates selection of at least one of the scene-sound sets. The processor executes a plurality of commands of the computer readable program, and the commands include: automatically downloading the selected one of the scene-sound sets from the computer device to the portable device according to the operation command; installing the downloaded scene-sound set.

According to an embodiment of the invention, in the portable device, the operation command includes a set name and a set address of the selected one of the scene-sound sets.

According to an embodiment of the invention, in the portable device, each of the scene-sound sets is selected from a group consisting of a scene set, a sound set, and a combination set of the scene set and the sound set.

According to an embodiment of the invention, in the portable device, the scene set includes a background frame and at least one widget.

According to an embodiment of the invention, in the portable device, the sound set includes a ringing sound, a notification sound, and a key feedback sound.

In the invention, a user may operate the personal terminal device to log in the scene-sound set system, so as to preview the scene-sound effects of all of the scene-sound sets installed in the portable device or generate the customized scene-sound set in the scene-sound set system. Therefore, before the scene-sound set system is downloaded, the scene-sound effect can be easily previewed as if the scene-sound effect is already installed, which increases the convenience of use. In addition, after the personal terminal device selects at least one scene-sound set and generates a selection signal, the portable device corresponding to the log-in signal may automatically download the selected scene-sound set, which further simplifies the operating steps of selecting and downloading the scene-sound set.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
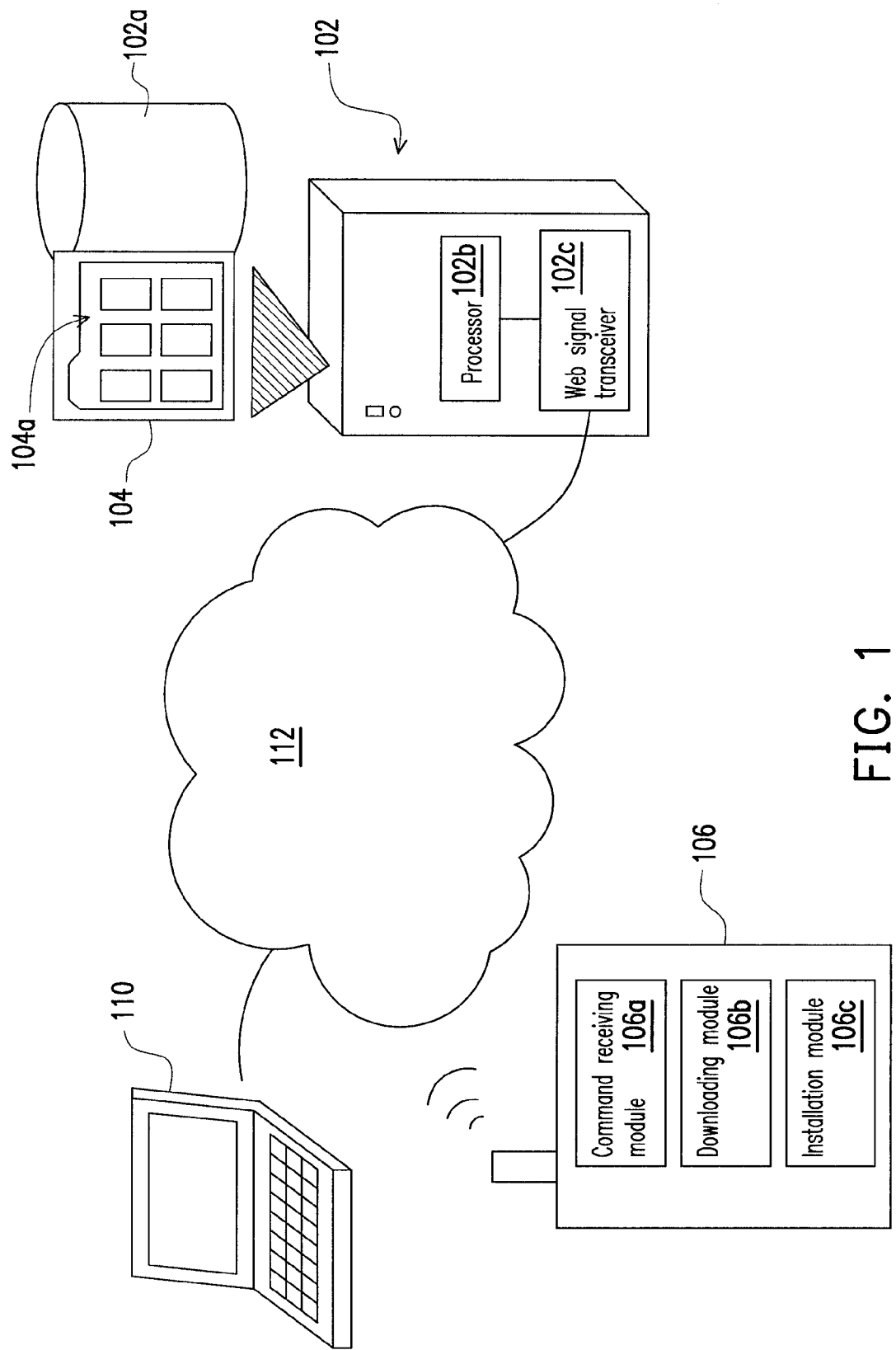
FIG. 1 is a schematic view illustrating a scene-sound set installation system according to an embodiment of the invention.

FIG. 1 is a schematic view illustrating a scene-sound set installation system according to an embodiment of the invention. With reference to FIG. 1, the scene-sound set installation system described in the present embodiment includes a scene-sound set system 104 installed in a computer device 102, a command receiving module 106a configured on a portable device 106, a downloading module 106b, and an installation module 106c.

Figure 2:
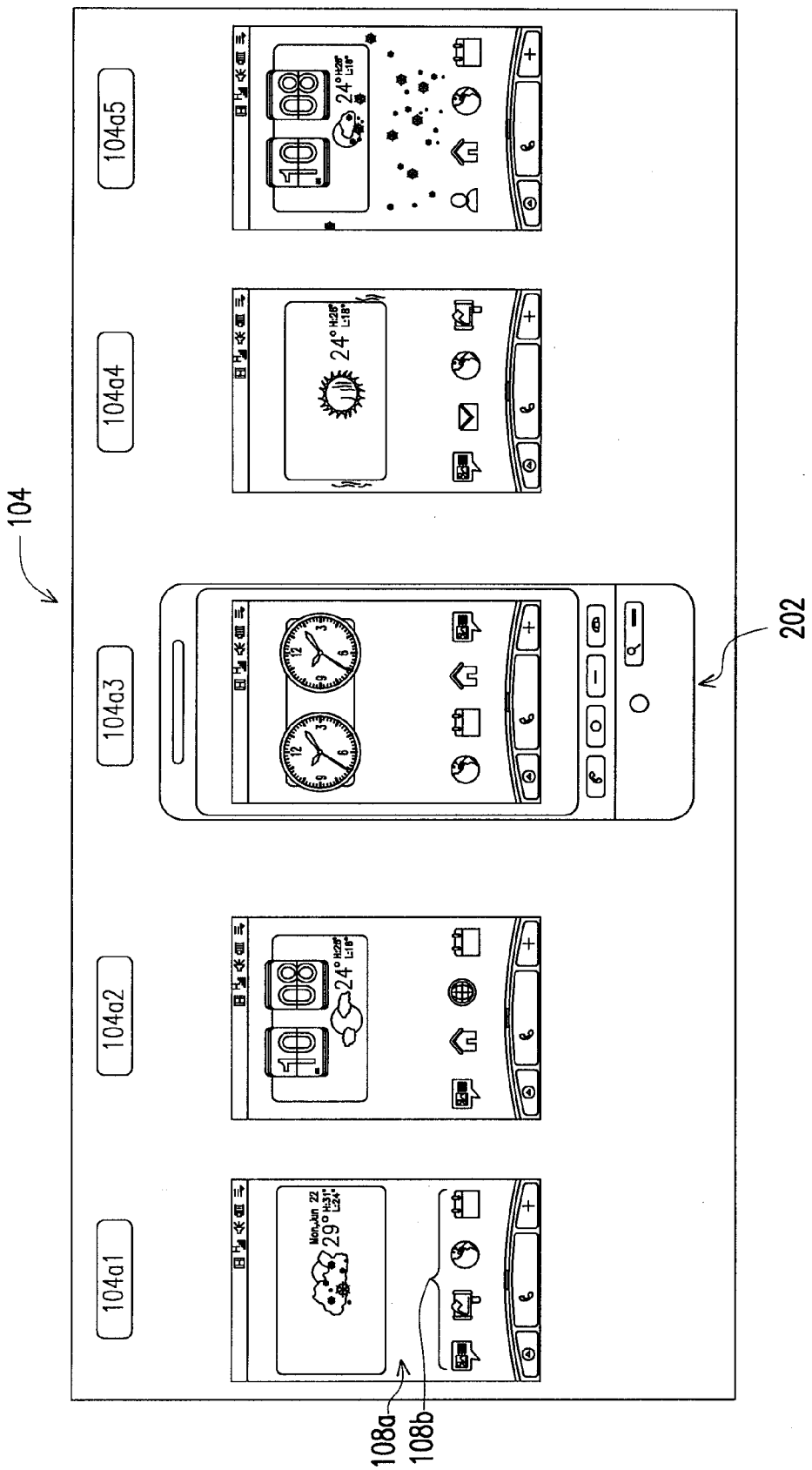
FIG. 2 is a schematic view illustrating a scene-sound set system according to an embodiment of the invention.

The computer device 102 is a web server, for instance. The computer device 102 has a computer readable and writable storage medium 102a that stores a computer readable program. Besides, the computer device 102 further includes a processor 102b and a web signal transceiver 102c. The processor 102b executes a plurality of commands of the computer readable program to provide functions of the scene-sound set system 104, and the web signal transceiver 102c serves to send and receive a signal through Internet. To be more specific, the scene-sound set system 104 may be implemented by executing a computer readable program. The computer readable program may be stored in a computer readable and writable storage medium 102a, and the processor 102b may execute commands of the computer readable program to embody the scene-sound set system 104 and the scene-sound set system described herein. In addition, the scene-sound set system 104 shown in FIG. 2 provides a plurality of scene-sound sets 104a. According to an embodiment of the invention, each of the scene-sound sets is a scene set, a sound set, or a combination set of the scene set and the sound set, for instance.

The scene set (e.g., the scene set 104a1 shown in FIG. 2) includes a background frame (e.g., 108a) and at least one widget (e.g., the widgets 108b shown in FIG. 2). Besides, the scene set may be installed in a portable device (e.g., a smart phone, a PDA, a PDA phone, or a touch phone) and may serve as a home screen. For instance, given a certain theme (e.g., a travel theme), the scene set may provide a background frame (e.g., a dual zone clock in the background frame 108a shown in FIG. 2) and at least one widget (e.g., a navigation widget or a currency-conversion widget that may be used during travel) relevant to the theme.

According to another embodiment of the invention, the sound set includes a ringing sound, a notification sound, and a key feedback sound. That is, the sound set includes all sound control items of the portable device. For instance, given a certain theme (e.g., a primitive forest theme), the sound set may provide a ringing sound (e.g., a beast roaring sound in the primitive forest), a notification sound (e.g., a frog croaking sound in the primitive forest), a key feedback sound (e.g., a bird chirping sound in the primitive forest), and even an alarm sound (e.g., a waterfall sound in the primitive forest) relevant to such theme.

FIG. 2 is a schematic view illustrating a scene-sound set system according to an embodiment of the invention. With reference to FIG. 2, in the present embodiment, a frame of the scene-sound set system 104 merely displays five scene-sound sets (including scene sets 104a1, 104a2, 104a3, 104a4, and 104a5). However, the invention is not limited thereto, and according to a frame setting of the scene-sound set system 104, the same frame may display the different number of the scene-sound sets.

As shown in FIG. 1, when the user uses a personal terminal device 110 (e.g., a personal computer or a notebook computer) to log in the scene-sound set system 104 provided by the processor 102b of the computer device 102 through executing the computer readable program via the Internet 112, the user is able to browse the frame of the scene-sound set system 104 on the personal terminal device 110. The user logs in the scene-sound set system 104 through transmitting a log-in signal from the personal terminal device 110 to the web signal transceiver 102c of the computer device 102; after the scene-sound set system 104 confirms registration information corresponding to the log-in signal, the frame of the scene-sound set system 104 is transmitted to the personal terminal device 110 through a digital signal that can be interpreted by a browser of the personal terminal device 110, and then the personal terminal device 110 interprets the digital signal through the browser and opens the frame of the scene-sound set system 104.

When the user browses the frame of the scene-sound set system 104 on the personal terminal device 110, the user is able to operate the personal terminal device 110 to generate an interaction event signal (e.g., dragging or selecting a cursor) and accordingly browse a preview scene-sound effect including a preview image (for example, a preview image 202 shown in FIG. 2) or a sound effect on the frame of the scene-sound set system 104. Here, the preview scene-sound effect of each of the scene-sound sets is installed in the portable device. On the other hand, the user may operate the personal terminal device to generate another interaction event signal and accordingly modify one of the scene-sound sets in the scene-sound set system 104 to establish a customized scene-sound set or directly establish a new scene-sound set. For instance, the user may drag a background, a widget, or various sound control items to any scene-sound set or a blank scene-sound set of the scene-sound set system 104 to produce a customized scene set and/or a customized sound set.

After browsing the preview scene-sound effects of the scene-sound sets installed in the portable device or establishing the customized scene-sound set, the user may connect the personal terminal device 110 to the computer device 102 through the Internet 112 and transmit a selection signal to the scene-sound set system 104 to select at least one of the scene-sound sets After the web signal transceiver 102c of the computer device 102 receives the selection signal, the scene-sound set system 104 transmits an operation command to the portable device 106 corresponding to the registration information that the user logs in the scene-sound set system 104 through the web signal transceiver 102c according to the selection signal. To be specific, according to the registration information corresponding to the log-in signal generated when the user logs in the scene-sound set system 104, the scene-sound set system 104 may transmit the operation command to the portable device 106 corresponding to the registration information. According to another embodiment of the invention, the personal terminal device 110 and the portable device 106 simultaneously log in the scene-sound set system 104, and in the scene-sound set system 104, a log-in signal that shows the user logs in the scene-sound set system 104 through the personal terminal device 110 corresponds to the portable device 106. The operation command includes a set name and a set address of the selected scene-sound set. Namely, a stored address and a stored name of the selected scene-sound set are packaged as a command packet, and the command pocket is transmitted to the portable device 106.

The command receiving module 106a of the portable device 106 receives the operation command. After that, the downloading module 106b of the portable device 106 automatically connects the computer device 102 and downloads the selected scene-sound set to the portable device 106 from the computer device 102 according to the stored address and the set name of the selected scene-sound set in the received operation command. In another embodiment, the web signal transceiver 102c of the computer device 102 receives a download request from the portable device 106 and transmits the selected scene-sound set to the portable device 106 through the web signal transceiver 102c according to the download request.

The installation module 106c of the portable device 106 installs the downloaded scene-sound set into the portable device 106. In an embodiment, when the user operates the portable device 106 to generate a confirm-installation selection signal, the installation module 106c installs the selected scene-sound set according to the confirm-installation selection signal. That is, when the number of the simultaneously downloaded scene-sound sets or the downloaded scene-sound sets is more than one, the user may select one of the downloaded scene-sound sets on the portable device 106 for installation. In another embodiment, the installation module 106c may automatically install the downloaded scene-sound set to the portable device 106 after the downloading module 106b completely downloads the selected scene-sound set.

The command receiving module 106c, the downloading module 106b, and the installation module 106c of the portable device 106 described above may be implemented by executing a computer readable program The computer readable program may be stored in a computer readable and writable storage medium, and the processor of the portable device 106 may execute the commands of the computer readable program to perform the aforementioned functions.

Figure 3:
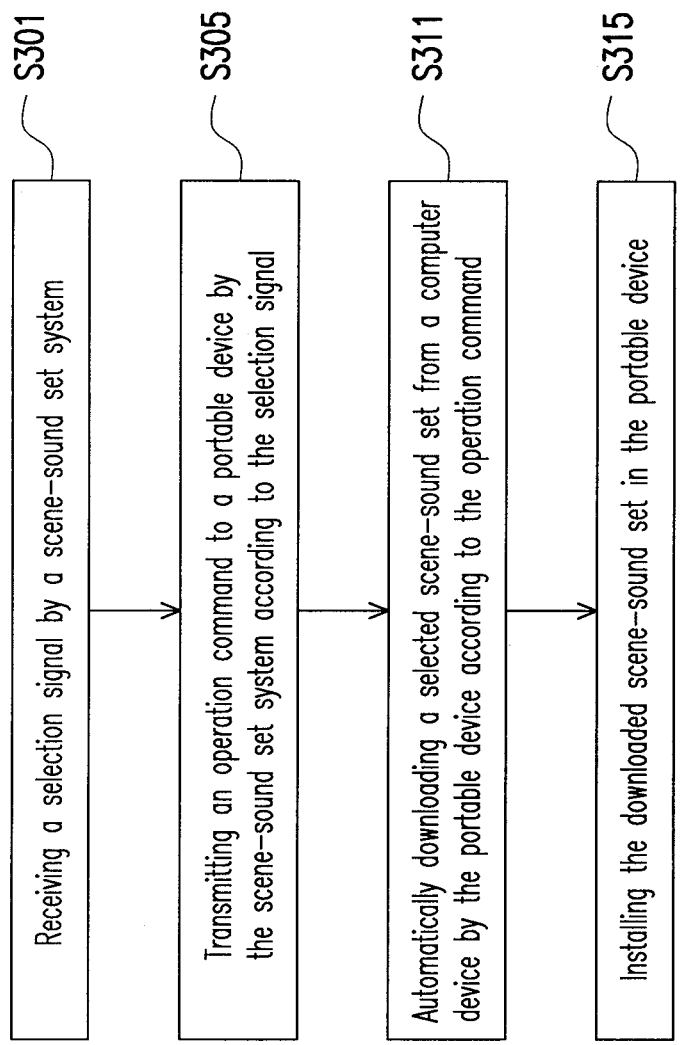
FIG. 3 is a simplified flow chart illustrating a scene-sound set operating method according to an embodiment of the invention.

FIG. 3 is a simplified flow chart illustrating a scene-sound set operating method according to an embodiment of the invention. With reference to FIG. 3, in step S301, a scene-sound set system receives a selection signal. The scene-sound set system (e.g., the scene-sound set system 104 shown in FIG. 1) is run by a computer device (e.g., the computer 102 device shown in FIG. 1) and provides a plurality of scene-sound sets, and the selection signal indicates selection of at least one of the scene-sound sets. Note that the selection signal may be transmitted to the scene-sound set system from a personal terminal device (e.g., the personal terminal device 110 shown in FIG. 1) connected to the computer device through the Internet (e.g., the Internet 112 shown in FIG. 1). According to an embodiment of the invention, before the scene-sound set system receives the selection signal, the user further connects the personal terminal device to the computer device and modifies one of the scene-sound sets in the scene-sound set system to establish a customized scene-sound set or directly establishes a new scene-sound set. According to another embodiment of the invention, before the scene-sound set system receives the selection signal, the user further connects the personal terminal device to the computer device and generates a preview scene-sound effect on the personal terminal device, wherein the preview scene-sound effect of each of the scene-sound sets is installed in the portable device.

In step S305, the scene-sound set system transmits an operation command to a portable device (e.g., the portable device 106 shown in FIG. 1) according to the selection signal. To be specific, according to the registration information corresponding to the log-in signal generated when the user logs in the scene-sound set system, the scene-sound set system may transmit the operation command to the portable device corresponding to the registration information. According to another embodiment of the invention, the personal terminal device and the portable device simultaneously log in the scene-sound set system, and in the scene-sound set system, a log-in signal that shows the user logs in the scene-sound set system through the personal terminal device corresponds to the portable device. The operation command includes a set name and a set address of the selected scene-sound set. Namely, a stored address and a stored name of the selected scene-sound set are packaged as a command packet, and the command pocket is transmitted to the portable device. In step S311, according to the operation command, the portable device automatically downloads the selected scene-sound set from the computer device. In step S315, the downloaded scene-sound set is installed in the portable device.

In the aforementioned embodiments related to the scene-sound set installation system, the scene-sound set has been defined in detail, and thus description of the scene-sound set is not repeated in the present embodiment.

To sum up, according to the invention, the user may operate the personal terminal device to log in the scene-sound set system, so as to preview the scene-sound effects of all of the scene-sound sets installed in the scene-sound set system or generate the customized scene-sound set in the scene-sound set system. Therefore, before the scene-sound set system is downloaded, the scene-sound effect can be easily previewed as if the scene-sound effect is already installed, which significantly increases the convenience of use. In addition, after the user operates the personal terminal device to select at least one scene-sound set and thereby generate a selection signal, the portable device corresponding to the log-in signal may automatically download the selected scene-sound set, which further simplifies the operating steps of selecting and downloading the scene-sound set.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A scene-sound set operating method adapted to a portable device, wherein a scene-sound set system comprises a plurality of scene-sound sets, and each of the scene-sound sets comprises a background frame, at least one widget, and at least one sound control item, the scene-sound set operating method comprising:

generating a preview scene-sound effect on a personal terminal device, wherein the preview scene-sound effect including a plurality of preview images and sound effects respectively corresponding to the scene-sound sets;

when at least one of the background frames, at least one of the widgets, and at least one of the sound control items are dragged to a blank scene-sound set from the scene-sound sets by a user of the portable device, creating a customized scene-sound set comprising the dragged background frame, the dragged widget, and the dragged sound control item in the blank scene-sound set;

generating by the personal terminal device a selection signal indicating at least one of the scene-sound sets according to user selection based on the preview scene-sound effect or the customized scene-sound set, and sending the selection signal to the scene-sound set system by the personal terminal device;

receiving an operation command by the portable device, the operation command being transmitted from the scene-sound set system run by a computer device and comprising a name and an address of the selected scene-sound set, wherein the scene-sound set system transmits the operation command to the portable device according to the selection signal transmitted from the personal terminal device;

automatically downloading the selected one of the scene-sound sets from the computer device by the portable device according to the name and the address in the operation command; and installing the downloaded scene-sound set in the portable device.

2. The scene-sound set operating method as recited in claim 1, wherein the operation command comprises a set name and a set address of the selected one of the scene-sound sets.

3. The scene-sound set operating method as recited in claim 1, wherein the at least one sound control item comprises a ringing sound, a notification sound, and a key feedback sound.

4. A portable device, wherein a scene-sound set system comprises a plurality of scene-sound sets, and each of the scene-sound sets comprises a background frame, at least one widget, and at least one sound control item, the portable device comprising:

a computer readable and writable storage medium storing a computer readable program;

a web signal transceiver receiving an operation command transmitted from the scene-sound set system, the operation command being run by a computer device and comprising a name and an address of the selected scene-sound set, wherein the scene-sound set system transmits the operation command to the portable device according to a selection signal transmitted from the personal terminal device, and the selection signal indicates selection of at least one of the scene-sound sets according to a preview scene-sound effect, wherein the preview scene-sound effect is generated on the personal terminal device, the preview scene-sound effect includes a plurality of preview images and sound effects respectively corresponding to the plurality of scene-sound sets, and the personal terminal device generates the selection signal indicating a customized scene-sound set or at least one of the scene-sound sets according to user selection based on the preview scene-sound effect and sends the selection signal to the scene-sound set system;

a processor executing a plurality of commands of the computer readable program, wherein the commands comprise:

when at least one of the background frames, at least one of the widgets, and at least one of the sound control items are dragged to a blank scene-sound set by a user of the portable device from the scene-sound sets, creating the customized scene-sound set comprising the dragged background frame, the dragged widget, and the dragged sound control item in the blank scene-sound set;

automatically downloading the selected one of the scene-sound sets from the computer device to the portable device according to the name and the address in the operation command; and installing the downloaded scene-sound set.

5. The portable device as recited in claim 4, wherein the operation command comprises a set name and a set address of the selected one of the scene-sound sets.

6. The portable device as recited in claim 4, wherein the at least one sound control item comprises a ringing sound, a notification sound, and a key feedback sound.

* * * * *